US007705804B2

(12) United States Patent
Kim

(10) Patent No.: US 7,705,804 B2
(45) Date of Patent: Apr. 27, 2010

(54) PLASMA DISPLAY APPARATUS AND DRIVING METHOD THEREOF

(75) Inventor: Oe Dong Kim, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 1066 days.

(21) Appl. No.: 11/218,556

(22) Filed: Sep. 6, 2005

(65) Prior Publication Data

US 2006/0050019 A1 Mar. 9, 2006

(30) Foreign Application Priority Data

Sep. 7, 2004 (KR) ...................... 10-2004-0071463
Sep. 7, 2004 (KR) ...................... 10-2004-0071464
Sep. 7, 2004 (KR) ...................... 10-2004-0071466

(51) Int. Cl.
*G09G 3/28* (2006.01)
*G09G 5/00* (2006.01)
*G06F 3/038* (2006.01)

(52) U.S. Cl. ........................................ 345/60; 345/204

(58) Field of Classification Search ................. 345/204, 345/60–72

See application file for complete search history.

(56) References Cited

U.S. PATENT DOCUMENTS

2004/0085262 A1* 5/2004 Lee ............................. 345/41
2004/0217923 A1* 11/2004 Jung et al. ..................... 345/60
2004/0246206 A1* 12/2004 Choi ........................... 345/60

FOREIGN PATENT DOCUMENTS

KR 10-2002-78657 10/2002

* cited by examiner

*Primary Examiner*—Alexander S. Beck
(74) *Attorney, Agent, or Firm*—McKenna Long & Aldridge LLP

(57) ABSTRACT

Disclosed are a plasma display apparatus and a driving method thereof. The plasma display apparatus comprise a plasma display panel having a scan electrode and a sustain electrode, a scan driver for sequentially supplying a first rising ramp waveform, a first falling ramp waveform and a second falling ramp waveform to the scan electrode during the reset period of the first subfield of a plurality of subfields, and a sustain driver for supplying a round waveform to the sustain electrode while the first rising ramp waveform is being supplied to the scan electrode. In the driving method of a plasma display apparatus, which divides a plurality of subfields with a different number of times of light emission into a rest period, an address period and a sustain period, and displays an image by applying a signal to the scan electrode, sustain electrode and address electrode in the respective periods, a surface discharge occurs two times between the scan electrode and the sustain electrode in the reset period of the first subfield of the plurality of subfields, and an opposite discharge occurs between the scan electrode and the address electrode.

20 Claims, 13 Drawing Sheets

(a)

(b)

PLASMA DISPLAY APPARATUS AND DRIVING METHOD THEREOF

This nonprovisional application claims priority under 35 U.S.C. §119(a) on Patent Applications Nos. 10-2004-0071466, 10-2004-0071464 & 10-2004-0071463 filed in Korea on Sep. 7, 2005, the entire contents of which are hereby incorporated by reference.

BACKGROUND OF THE INVENTION

1. Field of the Invention

The present invention relates to a plasma display apparatus and a driving method thereof, and more particularly, a plasma display apparatus that is capable of improving contrast and driving margin by enhancing a driving waveform supplied in a reset period of each subfield, and a driving method thereof.

2. Description of the Background Art

Generally, a plasma display panel (PDP) radiates a phosphorus by an ultraviolet with a wavelength of 147 nm generated during a discharge of He+Xe or Ne+Xe gas to thereby display a picture including characters and graphics.

FIG. 1 is a perspective view showing a structure of a conventional three-electrode AC surface plasma display panel. As shown therein, the three-electrode AC surface-discharge PDP includes a scan electrode 11(hereinafter, 'Y electrode') and a sustaining electrode 12(hereinafter, 'Z electrode') formed on an upper substrate 10, and an address electrode 22(hereinafter, 'X electrode) formed on a lower substrate 20. The Y electrode 11 and the Z electrode 12 are formed from transparent electrodes, e.g., indium-tin-oxide (ITO), 11*a* and 12*a*, respectively. Bus electrodes 11*b* and 12*b* are formed on the Y electrode 11 and the Z electrode 12, respectively, so as to reduce resistance. On the upper substrate 10 provided with the Y electrode 11 and the Z electrode 12, an upper dielectric layer 13*a* and a protective film 14 are disposed. Wall charges generated upon plasma discharge are accumulated in the upper dielectric layer 13*a*. The protective film 14 protects the upper dielectric layer 13*a* from a sputtering generated during the plasma discharge and improves the emission efficiency of secondary electrons. This protective film 14 is usually made from MgO.

A lower dielectric layer 13*b* and barrier ribs 21 are formed on the lower substrate 20 provided with the X electrode 22. A phosphorus layer 23 is coated on the surfaces of the lower dielectric layer 13*b* and the barrier ribs 21. The X address electrode 22 is formed in a direction crossing the X electrode 11 and the Z electrode 12. The barrier ribs 21 are formed in parallel to the X electrode 22 to prevent an ultraviolet ray and a visible light generated by the discharge from being leaked into the adjacent discharge cells. The phosphorus layer 23 is excited and radiated by an ultraviolet ray generated upon plasma discharge to produce a red, green or blue color visible light ray. An inactive mixture gas, such as He+Xe or Ne+Xe, for a gas discharge is injected into a discharge space defined between the upper/lower substrate 10 and 20 and the barrier ribs 21. A driving waveform according to a driving method of a conventional plasma display panel having such a structure will be described as shown in FIG. 2.

FIG. 2 is a view showing a driving waveform according to a driving method of a conventional plasma display panel. As shown in FIG. 2, the plasma display panel is divided into a reset period for initializing, the full fields, an address period for selecting a cell to be discharged, a sustain period for sustaining a discharge of the selected cell for its driving, and an erase period for erasing wall charges within the discharged cell.

In the reset period, a rising ramp waveform Ramp-up is simultaneously applied to all the scan electrodes Y in a set-up interval. This rising ramp waveform Ramp-up causes a discharge within cells at the full field to generate wall charges within the cells. The setup discharge causes positive wall charges to be accumulated in the address electrode X and the sustain electrode Z, and negative wall charges to be accumulated in the scan electrode Y. In the set-down internal, after the rising ramp waveform was supplied, a falling ramp waveform Ramp-down, falling from a positive voltage lower than a peak voltage of the rising ramp waveform to a specific voltage level lower than the ground(GND) level voltage, causes a weak erasure discharge within the cells, to thereby erase excessive wall charges. The set-up discharge causes wall uniformly left within the cells of the full field to the extent that an address discharge may be performed stably.

In the address period, negative scan pulses SCAN are sequentially applied to the scan electrodes Y and at the same time positive data pulses DATA synchronized with the scan pulses SCAN are applied to the address electrodes X. When the voltage difference between the scan pulse SCAN and the data pulse DATA is added to the wall voltages generated in the reset period, the address discharge is generated within the cell to which the data pulse DATA is applied. When sustain voltages Vs are applied, wall charges to the extent that the discharge might be generated are formed within the cells selected by the address discharge. Positive DC voltage Vz is applied to the sustain electrode Z for the set-down interval and the address period so as not to generate a mis-discharge between the scan electrode Y and the sustain electrode Z.

In the sustain period, sustain pulses SUS are alternately applied to the scan electrodes Y and the sustain electrodes Z. In the cells selected by the address discharge, a sustain discharge, i.e., display discharge, is generated between the scan electrode Y and the sustain electrode Z whenever each sustain pulse SUS is applied as the wall voltage within the cell is added to the sustain pulse SUS.

Finally, after the sustain discharge has been finished, a voltage of an erasing ramp waveform Ramp-ers having a small pulse width is applied to the sustain electrode Z to thereby erase wall charges left within the cells of the full screen.

In the conventional driving method of a plasma display panel to which a driving waveform is adapted, the black brightness is relatively high upon driving, thus leading to a problem of deteriorating the contrast ratio of the panel.

Recently, the content or Xe tends to be increased in order to enhance discharge efficiency in the sealed discharge gas of the PDP. In this case, if a driving waveform according to the conventional driving method of the plasma display panel is adapted, the interference of the address electrode Y on a discharge between the scan electrode and the sustain electrode Z is increased to thus increase a reset voltage. Resultantly, in the event such a driving waveform is adapted to a large screen, there is a problem that the driving margin of the panel is deteriorated.

Moreover, there is a problem that if the content of Xe is increased, the address jitter characteristic is deteriorated, which makes a sustain discharge unstable in the subsequent period, i.e., a sustain period.

SUMMARY OF THE INVENTION

Accordingly, an object of the present invention is to solve at least the problems and disadvantages of the background art.

It is an object of the present invention to provide a plasma display apparatus that is capable of improving contrast and driving margin by enhancing a driving waveform supplied in a reset period of each subfield, and a driving method thereof.

It is another object of the present invention to provide a plasma display apparatus that is capable of improving a driving margin of the panel by suppressing an increase of a reset voltage upon a discharge even if the content of xe increases, and a driving method thereof.

It is still another object of the present invention to provide a plasma display apparatus that can improve the jitter characteristic by stabilizing an address discharge, and thus can stably generate a sustain discharge.

There is provided a plasma display apparatus according one aspect of to the present invention, comprising: a plasma display panel having a scan electrode and a sustain electrode; a scan driver for sequentially supplying a first rising ramp waveform, a first falling ramp waveform and a second falling ramp waveform to the scan electrode during the reset period of the first subfield of a plurality of subfields; and a sustain driver for supplying a round waveform to the sustain electrode while the first rising ramp waveform is being supplied to the scan electrode.

There is provided a plasma display apparatus according another aspect of to the present invention, comprising: a plasma display panel having a scan electrode and a sustain electrode; a scan driver for sequentially supplying a first rising ramp waveform to the scan electrode and then at least one falling ramp waveform during the reset period of the first subfield of a plurality of subfields; and a sustain driver for supplying a round waveform to the sustain electrode while the first rising ramp waveform is being supplied to the scan electrode.

There is provided a driving method of a plasma display apparatus according to the present invention, which divides a plurality of subfields with a different number of times of light emission into a rest period, an address period and a sustain period, and displays an image by applying a signal to the scan electrode, sustain electrode and address electrode in the respective periods, a surface discharge occurs two times between the scan electrode and the sustain electrode in the reset period of the first subfield of the plurality of subfields, and an opposite discharge occurs between the scan electrode and the address electrode.

The plasma display apparatus and driving method thereof according to the present invention has the effect of improving contrast upon driving the plasma display panel.

Furthermore, the present invention has the effect of improving the jitter characteristic in an address period, simultaneously while acquiring a high driving margin, by enhancing a driving margin supplied in the reset period of each subfield and making wall charges uniform.

BRIEF DESCRIPTION OF THE DRAWINGS

The present invention will be described in detail with reference to the following drawings in which like numerals refer to like elements.

DETAILED DESCRIPTION OF PREFERRED EMBODIMENTS

Figure 1:
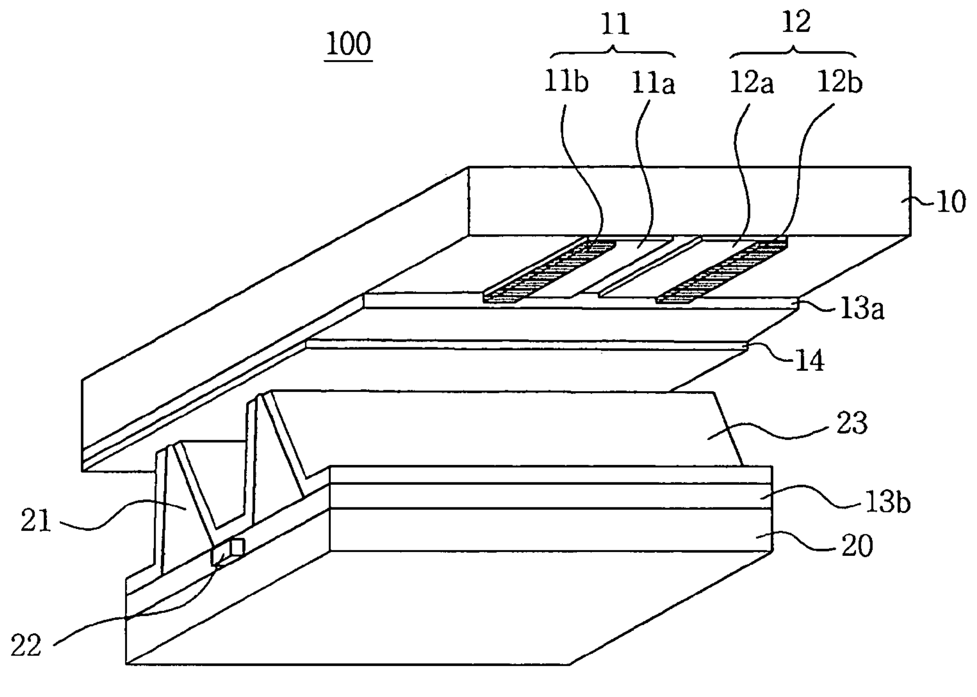
FIG. 1 is a perspective view showing a structure of a conventional three-electrode AC surface plasma display panel.
Figure 2:
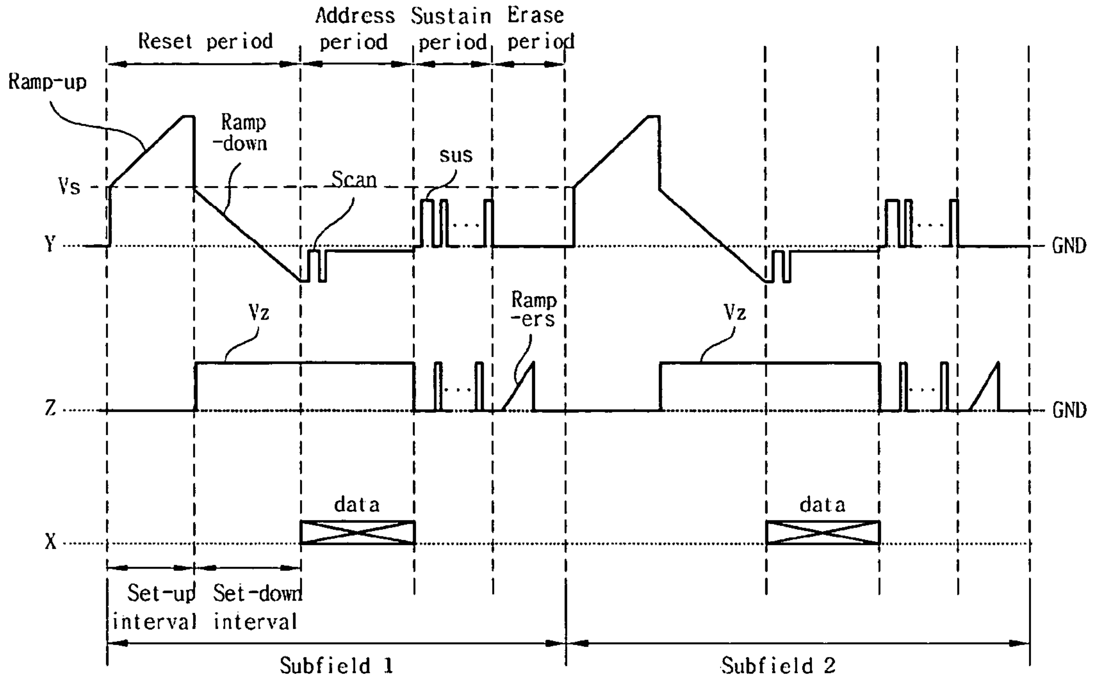
FIG. 2 is a view showing a driving waveform according to a driving method of a conventional plasma display panel.

Preferred embodiments of the present invention will be described in a more detailed manner with reference to the drawings.

A plasma display apparatus according one aspect of to the present invention comprises: a plasma display panel having a scan electrode and a sustain electrode; a scan driver for sequentially supplying a first rising ramp waveform, a first falling ramp waveform and a second falling ramp waveform to the scan electrode during the reset period of the first subfield of a plurality of subfields; and a sustain driver for supplying a round waveform to the sustain electrode while the first rising ramp waveform is being supplied to the scan electrode.

The lowest voltage of the first falling ramp waveform and second falling ramp waveform is a negative voltage.

The lowest voltage of the second falling ramp waveform is lower than the lowest voltage of the first falling ramp waveform.

The highest voltage of the round waveform is a voltage of sustain pulse applied in the sustain period.

The scan driver supplies to the scan electrode a third falling ramp waveform falling after maintaining a predetermined voltage during the reset period of the subfields excepting the first subfield of the plurality of subfields and consecutively a fourth falling ramp waveform subsequent to the third falling ramp waveform, and the sustain driver supplies a second rising ramp waveform to the sustain electrode while the scan electrode is maintaining a predetermined voltage.

The predetermined voltage is a voltage of the ground level.

The highest voltage of the second rising ramp waveform is a sustain voltage.

The lowest voltage of the fourth falling ramp is the same as the lowest voltage of the second falling ramp waveform.

The scan driver sequentially supplies to the scan electrode a second rising ramp waveform, third falling ramp waveform and fourth falling ramp waveform smaller in size than the first rising ramp waveform during the reset period of the subfields excepting the first subfield of the plurality of subfields, and the sustain driver maintains the sustain period at a predetermined voltage during the reset period of the subfields excepting the first subfield of the plurality of subfields.

The predetermined voltage is a voltage of the ground level.

The highest voltage of the second rising ramp waveform is a sustain voltage.

The scan driver sequentially supplies to the scan electrode a third falling ramp waveform and a fourth falling ramp waveform during the reset period of the subfields excepting the first subfield of the plurality of subfields, and the sustain driver supplies a round waveform while the third falling ramp waveform is being supplied to the scan electrode.

The lowest voltage of the third falling ramp waveform is the same as the lowest voltage of the first falling ramp waveform, and the lowest voltage of the fourth falling ramp waveform is the same as the lowest voltage of the second falling ramp waveform.

The highest voltage of the round waveform is a voltage of sustain pulse applied in the sustain period.

A plasma display apparatus according another aspect of to the present invention comprises: a plasma display panel having a scan electrode and a sustain electrode; a scan driver for sequentially supplying a first rising ramp waveform to the scan electrode and then at least one falling ramp waveform during the reset period of the first subfield of a plurality of subfields; and a sustain driver for supplying a round waveform to the sustain electrode while the first rising ramp waveform is being supplied to the scan electrode.

In a driving method of a plasma display apparatus according to the present invention, which divides a plurality of subfields with a different number of times of light emission into a rest period, an address period and a sustain period, and displays an image by applying a signal to the scan electrode, sustain electrode and address electrode in the respective periods, a surface discharge occurs two times between the scan electrode and the sustain electrode in the reset period of the first subfield of the plurality of subfields, and an opposite discharge occurs between the scan electrode and the address electrode.

The reset period of the first subfield of the subfields includes: a set-up stage during which a first rising ramp waveform is applied to the scan electrode and a voltage of the ground GND level is applied to the sustain electrode; a first set-down stage during which a first falling ramp waveform falling from a predetermined voltage is applied to the scan electrode and a sustain voltage Vs is applied to the sustain electrode; and a second set-down stage during which a second falling ramp waveform maintaining a ground level voltage and then falling after a predetermined point of time is applied to the scan electrode and a voltage less than the sustain voltage Vs is applied to the sustain electrode.

The reset period of the subfields excepting the first subfield includes: a set-up stage during which a ground (GND) level voltage is applied to the scan electrode and a second rising ramp waveform smaller in size than a first rising ramp in the reset period of the first subfield; a first set-down stage during which a third falling ramp waveform falling from the ground level GND voltage is applied to the scan electrode and a voltage of the ground level GND is applied to the sustain electrode; and a second set-down stage during which a fourth falling ramp waveform falling from the lowest value of the third falling ramp waveform is applied to the scan electrode and a voltage of the ground level (GND) is applied to the sustain electrode.

The reset period of the subfields excepting the first subfield includes: a set-up stage during which a rising ramp waveform smaller in size than a rising ramp in the reset period of the first subfield is applied to the scan electrode and a ground level (GND) voltage is applied to the sustain electrode; a first set-down stage during which a third falling ramp waveform falling from a predetermined voltage is applied to the scan electrode and a voltage less than a sustain voltage Vs is applied to the sustain electrode; and a second set-down stage during which a fourth falling ramp waveform falling from the lowest value of the third falling ramp waveform is applied to the scan electrode and a voltage of the sustain voltage Vs is applied to the sustain electrode.

The reset period of the first subfield of the subfields includes: a set-up stage during which a predetermined voltage is applied to the scan electrode and a voltage of the ground GND level is applied to the sustain electrode; a first set-down stage during which a third falling ramp waveform falling from a predetermined voltage is applied to the scan electrode and a sustain voltage Vs is applied to the sustain electrode; and a second set-down stage during which a fourth falling ramp waveform maintaining a ground level voltage and then falling after a predetermined point of time is applied to the scan electrode and a voltage less than the sustain voltage Vs is applied to the sustain electrode.

Hereinafter, a plasma display apparatus and a driving method thereof according to the present invention will be described in detail with reference to the accompanying drawings.

Figure 3:
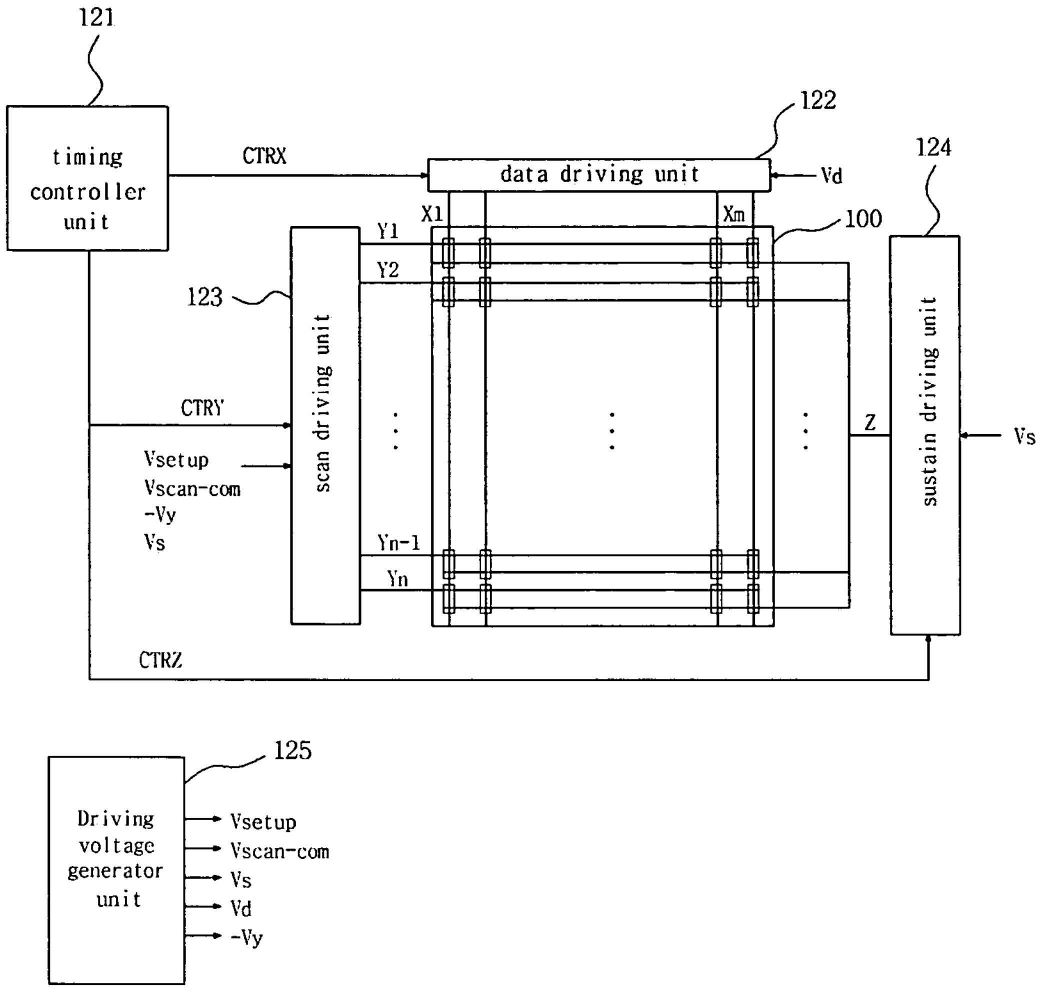
FIG. 3 is a view schematically showing a plasma display apparatus according to the present invention.

FIG. 3 is a view schematically showing a plasma display apparatus according to the present invention.

As shown in FIG. 3, the plasma display apparatus of the invention includes a plasma display panel 100, a data driver 122 for supplying data to address electrodes X1 to Xm formed on a lower substrate (not shown) of the plasma display panel 100, a scan driver 123 for driving scan electrodes Y1 to Yn, a sustain driver 124 for driving sustain electrodes Z, that is, common electrodes, a timing controller 121 for controlling the data driver 122, scan driver 123, sustain driver 124 and sustain pulse control unit 126 when the plasma display panel is driven; and a driving voltage generator for supplying a driving voltage required for each driver 122, 123 and 124.

First, in the plasmas display panel 100, an upper substrate (not shown) and a lower substrate (not shown) are attached at a predetermined interval, a multiplicity of electrodes, for example, a pair of scan electrodes Y1 to Yn and a pair of sustain electrodes Z, are formed on the upper substrate, and address electrodes X1 to Xm are formed on the lower substrate in a direction crossing the scan electrodes Y1 to Yn and the sustain electrodes Z.

The data driver 122 is supplied with data that is subject to an inverse-gamma correction and an error diffusion by an inverse-gamma correction circuit and an error diffusion circuit, and thereafter mapped onto each sub-field by a sub-field mapping circuit. The data driver 122 samples and latches a data in response to a timing control signal CTRX from the timing controller 121, and then supplies the data to the address electrodes X1 to Xm.

The scan driver 123 applies a rising ramp waveform Ramp-up to the scan electrodes Y1 to Yn and then sequentially applies a first falling ramp waveform Ramp-down and a second falling ramp waveform Ramp-down during the reset period of the first subfield of a plurality of subfields under control of the timing controller 121. Further, the scan driver 123 sequentially supplies a scanning pulse Sp having a scan voltage −Vy to the scan electrodes Y1 to Yn during the address period and then supplies a sustain pulse generated by an energy recovery unit provided therein to the scan electrodes during the sustain period under control of the timing controller 121.

The sustain driver 124 supplies a round waveform to the sustain electrodes Z during the reset period of the first subfield of the plurality of subfields under control of the timing controller 121 while the scan driver 123 is supplying a first falling ramp waveform Ramp-down to the scan electrodes. Further, the sustain driver 124 supplies a bias voltage to the sustain electrode Z during the address period and then is operated alternately with a scan driving circuit provided in the scan driver 123 to apply a sustain pulse sus to the sustain electrodes Z during the sustain period.

Although the scan drier 123 supplies two falling ramp waveforms to the scan electrodes during the reset period of the first subfield of the plurality of subfields, it can also supply one falling ramp waveform or three or more falling ramp waveforms to the scan electrodes according to the discharge characteristics of the plasma display panel. That is, the scan driver 123 can supply one or more falling ramp waveform to the scan electrodes. At this point, the sustain driver 124 supplies a round waveform to the sustain electrodes while a certain falling ramp waveform is being supplied to the scan electrodes.

Here, the first subfields may be a certain subfield of a plurality of subfields, preferably, a subfield having the lowest gray level weight.

The timing controller 121 receives vertical/horizontal synchronizing signals and a clock signal to generate timing control signals CTRX, CTRY and CTRZ required for the operation timing and synchronization of each driver 122, 123 and 124 during the reset period, address period and sustain period, and supplies the timing control signals CTRX, CTRY and CTRZ to the corresponding drivers 122, 123 and 124, thereby controlling each driver 122, 123 and 124.

The data control signal CTRX includes a sampling clock for sampling a data, a latch control signal and a switching control signal for controlling an ON/OFF time of an sustain driving circuit and of a driving switching device. The scan control signal CTRY includes a switching control signal for controlling an ON/OFF time of the energy recovery circuit and of the driving switching device. The sustain control signal CTRZ includes a switching control signal for controlling an ON/OFF time of the sustain driving circuit and driving switching device within the sustain driver 124.

The driving voltage generator 125 generates a setup voltage Vsetup, a scan common Vscan-com, a scan voltage −Vy, a sustain voltage Vs and a data voltage, etc. Such driving voltages may be changed depending upon a component of discharge gas or a structure of discharge cell.

Although the scan driver and sustain driver of the plasma display apparatus according to the present invention have been described with respect to the operation of supplying a certain waveform during the reset period of the first subfield of a plurality of subfields, various forms of waveforms can be supplied in the subfields excepting the first subfield according to the characteristics of the plasma display panel, for example, the discharge characteristics depending on the amount of inactive gas of the plasma display panel. This will be described in detail in the description of the driving method of a plasma display apparatus according to the present invention.

Figure 4:
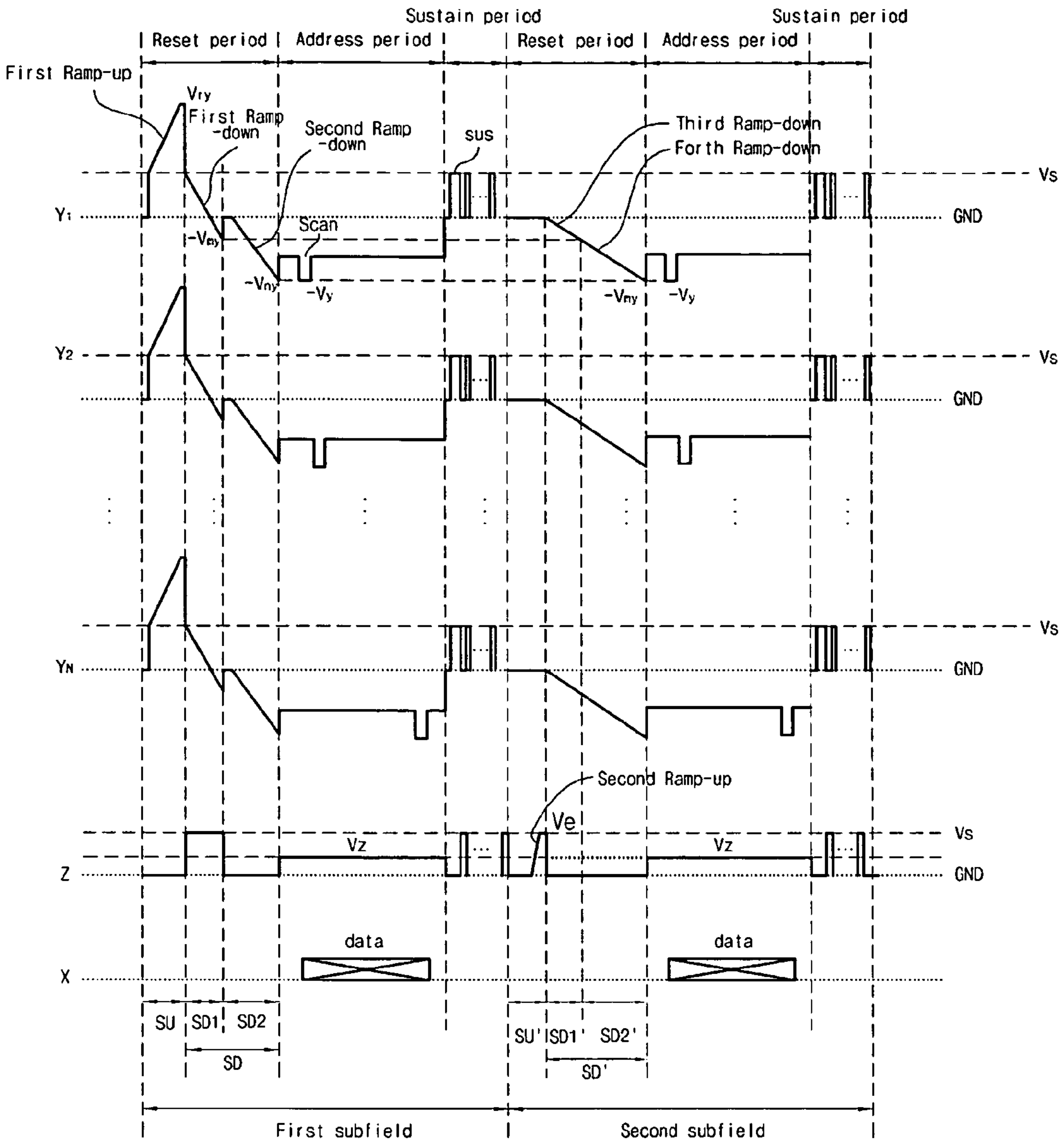
FIG. 4 is a view showing a first driving waveform according to a driving method of a plasma display panel according to the present invention.

FIG. 4 is a view showing a first driving waveform according to a driving method of a plasma display apparatus according to the present invention.

First, in the driving method of a plasma display apparatus of the present invention, a plurality of subfields are driven by supplying a driving waveform in a reset for initializing the full field, an address period for selecting a cell to be discharged, and a sustain period for sustaining a discharge of the selected cell for, respectively.

As the first driving waveform of the plasma display apparatus of the present invention, different reset waveforms are supplied in the reset period of the first subfield and the other subfields.

<First Subfield>

Upon driving the plasma display apparatus of the present invention, in the reset period of the first subfield, a first rising ramp waveform Ramp-up is simultaneously applied to all of the scan electrodes Y1 to Yn in a set-up (SU) interval, and a voltage of the ground GND level is applied to the sustain electrodes Z and maintained during the set-up interval. At this point, this first rising ramp waveform Ramp-up causes a surface discharge between the scan electrodes and the sustain electrodes within cells of the full field.

A set-down (SD) interval is divided into a first set-down interval SD1 and a second set-down SD2 interval. A first falling ramp waveform is supplied to all of the scan electrodes Y1 to Yn in the first set-down interval, and a second falling ramp waveform is supplied to all of the scan electrodes Y1 to Yn in the second set-down interval. A round waveform of a predetermined voltage is supplied to the sustain electrodes Z wile the first falling ramp waveform is being supplied to the scan electrodes.

The first falling ramp waveform falls from a positive voltage lower than a peak voltage Vry of the first rising ramp waveform to a specific voltage level −Vmy lower than the ground(GND) level voltage. Preferably, the lowest voltage, which is the specific voltage level −Vmy of the first falling ramp waveform, has a negative value so that sufficient surface discharge may occur between the scan electrodes and the sustain electrodes. Further, a predetermined voltage is applied the sustain electrodes and maintained during the first set-down SD1 interval during which a voltage of the first falling ramp waveform is supplied, to cause a weak surface discharge between the scan electrodes and the sustain electrodes, thereby erasing certain parts of excessive wall charges within cells. Preferably, the predetermined voltage applied to the sustain electrodes is a sustain voltage Vs for causing a surface discharge by providing a sufficient potential difference between the scan electrodes and the sustain electrodes.

The second falling ramp waveform rapidly rises from the edge of the first falling ramp waveform, i.e., a specific voltage level −Vmy to the ground GND level and then maintains the ground GND level for a predetermined period of time and then falls to a voltage −Vny smaller in size than the specific voltage level −Vmy less than the ground GND level. Preferably, the lowest voltage, which is the voltage −Vny of the second falling ramp waveform, has a negative value lower than the lowest value of the first falling ramp waveform supplied upon surface discharge so as to completely erase wall charges by generating a sufficient opposite discharge between the scan electrodes and the sustain electrodes. At this time, a voltage of the ground GND level or a predetermined positive voltage Vz is supplied to the sustain electrodes.

Accordingly, wall charges are uniformly distributed within discharge cells, thereby enabling a stable address charge in the subsequent address period.

The reason why the second falling ramp waveform applied to the scan electrodes is supplied after being rapidly risen to the ground GND level at the point of time when the first falling ramp waveform is finished is to prevent an instantaneous drop of a scan electrode voltage due to coupling between the scan electrodes and the sustain electrodes in a case where a voltage applied to the scan electrodes is continuously dropped along with a rapid drop of the voltage applied to the sustain electrodes.

<Other Subfields Excepting First Subfield>

Upon driving the plasma display apparatus of the present invention, in the driving waveform supplied in the reset period of the other subfields excepting the first subfield, as shown in the drawings, in the set-up SU interval, a voltage of the ground GND level is supplied to all of the scan electrodes Y1 to Yn and maintained, and a second rising ramp waveform having a voltage smaller in size than the first rising ramp waveform supplied in the reset period of the first subfield is supplied to the sustain electrodes. At this time, the cells that do not participate in a discharge in the sustain period of the first subfield are maintained without any discharge, while the cell that participate in a discharge in the sustain period of the subfield undergo a surface discharge between the scan electrodes and the sustain electrodes by the second rising ramp waveform, thereby erasing wall charges between the scan electrodes and the sustain electrode to some extent.

As a voltage Ve of the second rising ramp waveform, a voltage capable of causing a surface discharge between the scan electrodes and the sustain electrodes is used, preferably, a sustain voltage Vs is supplied so as to use the same voltage source used upon a sustain discharge.

Like the first subfield, a set-down (SD') interval is divided into a first set-down interval SD1' and a second set-down SD2' interval. A third falling ramp waveform is supplied to all of the scan electrodes Y1 to Yn in the first set-down interval, and a fourth falling ramp waveform is supplied to all of the scan electrodes Y1 to Yn in the second set-down interval. The sustain electrodes maintain a ground GND level voltage.

The third falling ramp waveform falls from the ground GND level to a voltage level −Vmy less than the ground GND level and continuously the fourth falling ramp waveform falls to a specific voltage level −Vny. Preferably, the lowest voltage, which is the specific voltage level −Vny of the fourth falling ramp waveform, has a negative value so as to completely erase wall charges by generating a sufficient opposite discharge between the scan electrodes and the sustain electrodes. That is, it is the same as a negative voltage of the second falling ramp waveform in the first subfield.

As described above, upon driving the plasma display apparatus of the present invention, wall charges accumulated in each electrode can be made uniform by supplying a predetermined reset driving waveform in the reset period of all the subfields, thereby enabling a stable discharge in the subsequent address period.

In the first driving method of the plasma display apparatus according to the present invention, the black brightness generated in the reset period will be described in FIG. 5.

Figure 5:
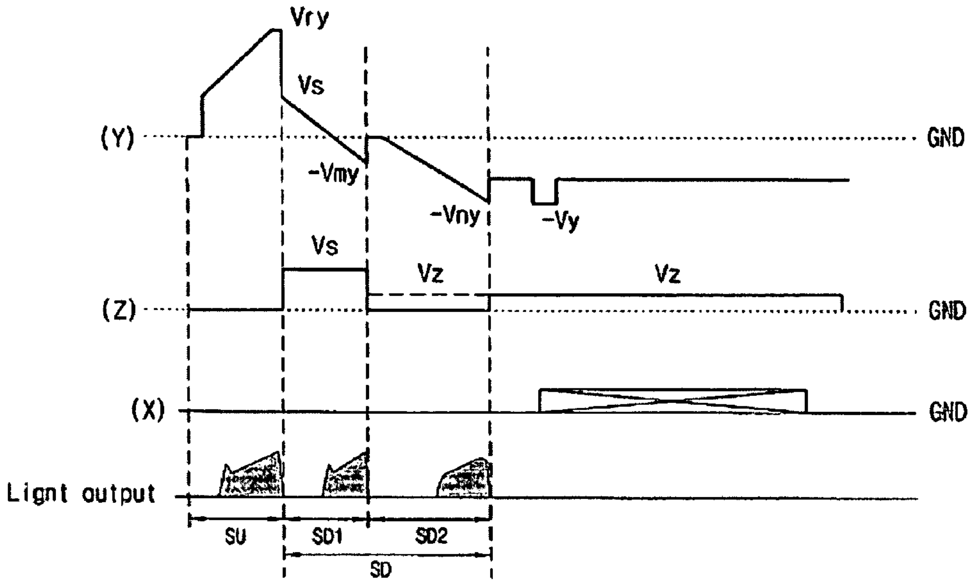
FIG. 5 is a view showing a black brightness generated in a reset period when driving the plasma display apparatus of the present invention.
Figure 5:
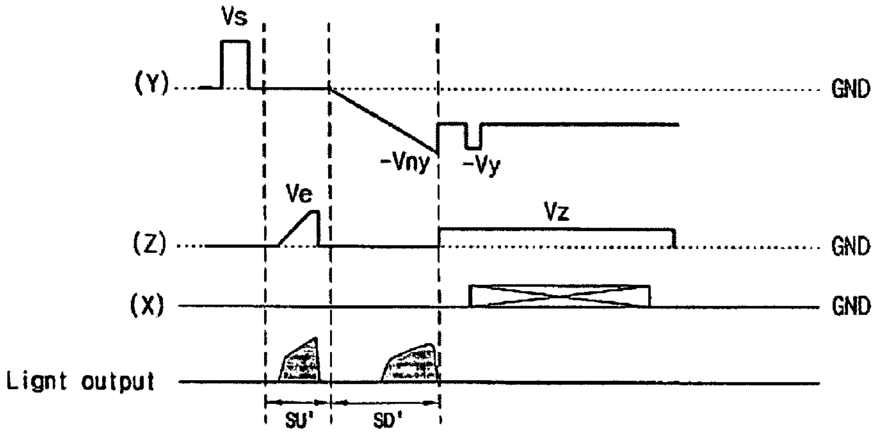

FIG. 5 is a view showing a black brightness generated in a reset period when driving the plasma display apparatus of the present invention. (a) of FIG. 5 illustrates a black brightness in the reset period of the first subfield, and (b) of FIG. 5 illustrates a black brightness in the reset period of the other subfields. Although the black brightness in the reset period of the first subfield is similar to the black brightness depending on a conventional driving waveform, the black brightness in the reset period of the other subfields excepting the first subfield is lower than that obtained when supplying a rising ramp waveform of a high voltage as in the first subfield. That is, upon driving the plasma display apparatus of the present invention, the black brightness is reduced to thus improve the contrast.

Figure 6:
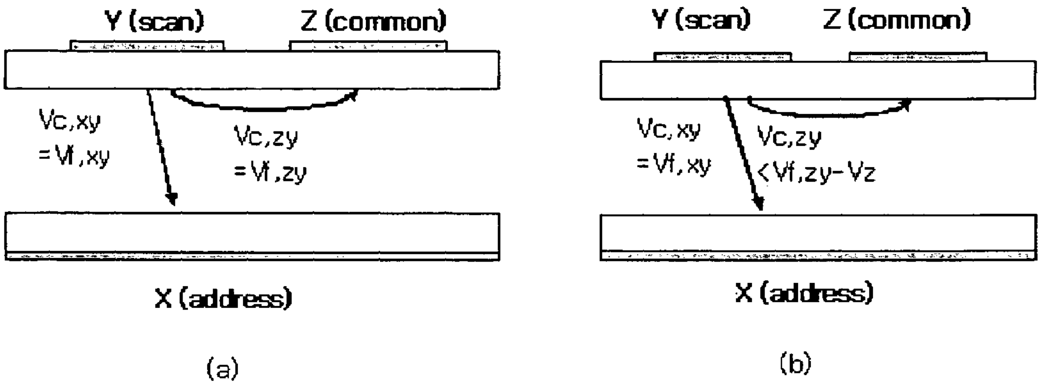
FIG. 6 is a view comparing the state of wall charges in a cell after a reset discharge according to a first driving method of a plasma display apparatus according to the present invention and the state of wall charges in a cell after a reset discharge according to a conventional driving method.

FIG. 6 is a view comparing the state of wall charges in a cell after a reset discharge according to a first driving method of a plasma display apparatus according to the present invention and the state of wall charges in a cell after a reset discharge according to a conventional driving method. Referring to FIG. 6, after a reset discharge according to a conventional driving method, a wall voltage satisfying a sustain surface discharge voltage Vf,xy is formed as a cell voltage Vc,zy between the scan electrodes and the sustain electrodes, and a wall charge satisfying an addressing opposite discharge voltage Vf,xy is formed as a cell voltage Vc,xy between the cell electrode and the address electrode. On the contrary, after a reset discharge according to the driving method of the present invention, a wall charge satisfying an opposite discharge voltage Vf,xy is formed as a voltage a cell voltage Vc,xy between the scan electrodes and the address electrodes, while a voltage lower than a sustain surface discharge voltage Vf,xy is formed as a cell voltage Vc,zy between the scan electrodes and the sustain electrodes.

Sine the cell voltage Vc,zy is a voltage before a specific voltage Vz is applied in the address period, it is smaller than the sustain surface discharge voltage Vf,zy by the specific voltage Vz, thereby acquiring as much margin as the specific voltage Vz. Such a specific voltage Vz is determined according to the characteristics of a panel, preferably, ranges from 0V to a sustain voltage Vs.

Figure 7:
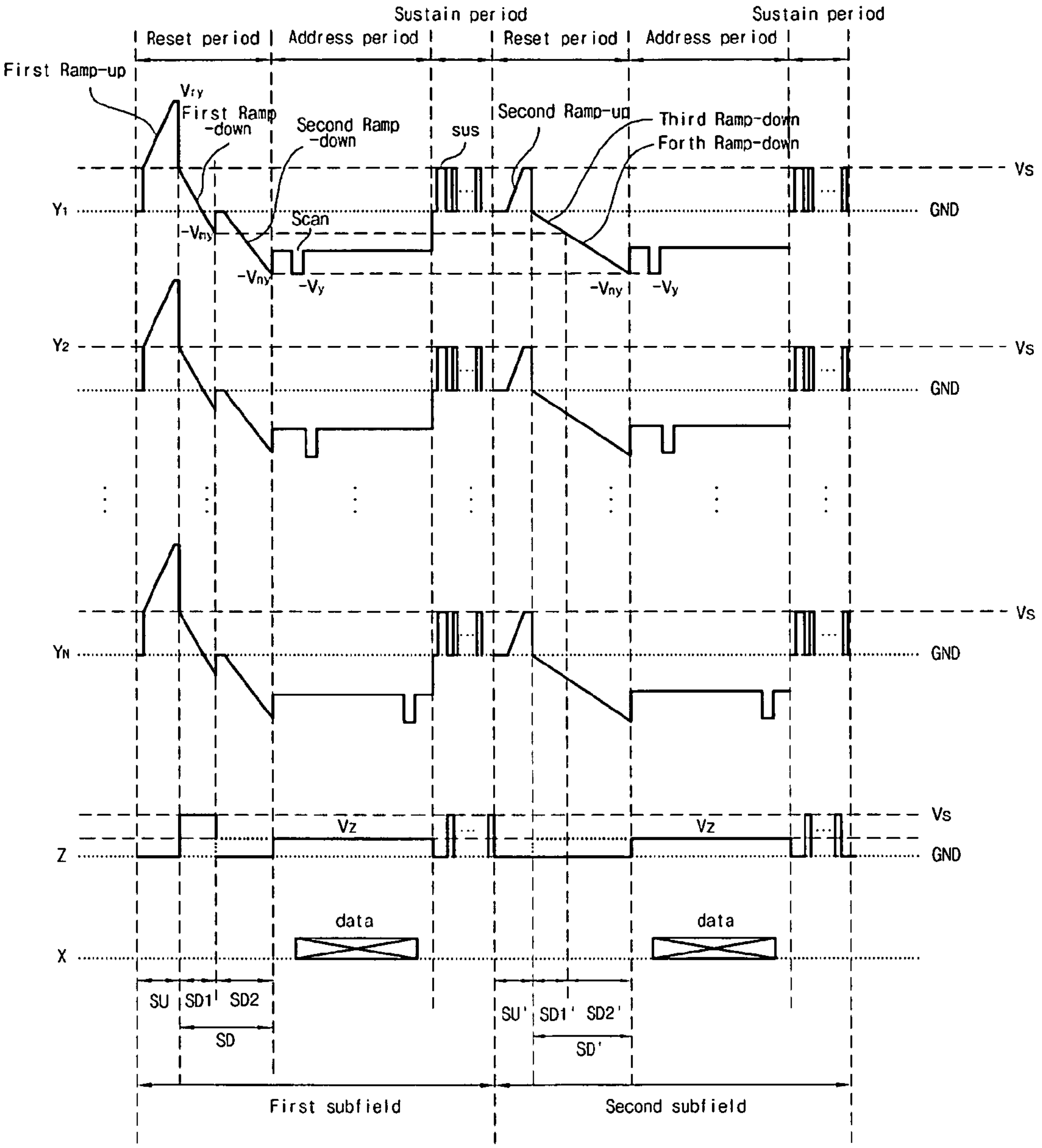
FIG. 7 is a view showing a second driving waveform according to the driving method of a plasma display apparatus according to the present invention.

FIG. 7 is a view showing a second driving waveform according to the driving method of a plasma display apparatus according to the present invention.

Like the first driving waveform of the present invention, as the second driving waveform of the plasma display apparatus of the present invention, different reset waveforms are supplied in the reset period of the first subfield and of the other subfields. The waveform supplied in the reset period of the first subfield is the same as the first driving waveform of the present invention, so a description thereof will be omitted.

<Other Subfields Excepting First Subfield>

In the reset period of the other subfields excepting the first subfield according to the present invention, a second rising ramp waveform 2nd Ramp-up smaller in size than the first rising ramp waveform in the first subfields is simultaneously applied to all of the scan electrodes Y1 to Yn in a set-up (SU1') interval, and a voltage of the ground GND level is applied to the sustain electrodes, thereby causing a surface discharge between the scan electrodes and the sustain electrodes within cells of the full field. Here, wall charges within the cells selected in the preceding subfield can be sufficiently erased by setting the highest voltage of the second rising ramp waveform to a sustain voltage Vs or higher or adjusting the slope of the second rising ramp waveform.

Like the first subfield, a set-down (SD') interval is divided into a first set-down interval SD1' and a second set-down SD2' interval. A third falling ramp waveform is supplied to all of the scan electrodes Y1 to Yn in the first set-down interval, and a fourth falling ramp waveform is supplied to all of the scan electrodes Y1 to Yn in the second set-down interval. The sustain electrodes maintain a ground GND level voltage.

The third falling ramp waveform falls from the ground GND level to a voltage level −Vmy less than the ground GND level. Preferably, the lowest voltage, which is the specific voltage level −Vmy of the third falling ramp waveform, has a negative value so as to cause a sufficient opposite discharge between the scan electrodes and the sustain electrodes. Further, a predetermined voltage is applied to the sustain electrodes, and the applied voltage is maintained in the first set-down interval SD1' during which the third falling ramp waveform is supplied, thereby causing a weak surface discharge between the scan electrodes and the sustain electrodes, and accordingly erasing certain parts of excessive wall charges within the cells. Here, the predetermined voltage applied to the sustain electrodes may be a voltage of the ground GND level for causing a surface discharge by providing a sufficient potential difference between the scan electrodes and the sustain electrodes, or may be a predetermined positive voltage Vz.

The fourth falling ramp waveform continuously falls from the lowest voltage of the third falling ramp waveform, i.e., a voltage level −Vmy less than the ground GND level to a specific voltage level −Vmy. At this time, a predetermined voltage is applied to the sustain electrodes and maintained in the reset period SD2' during which the fourth falling ramp waveform is supplied, thereby causing an opposite discharge between the scan electrodes and the address electrodes. Accordingly, most of wall charges within discharge cells are erased and thus the wall charges within the discharge cells are uniformly distributed, thereby enabling a stable address discharge. Here, the voltage applied to the sustain electrodes may be a voltage of the ground GND level, or may be a predetermined positive voltage Vz. Preferably, the voltage supplied to the sustain electrodes in the second set-down interval SD2' during which the third falling ramp waveform is supplied is the same as the voltage supplied to the sustain electrodes in the first set-down interval SD1' during which the third falling ramp waveform is supplied.

Among such driving waveforms according to the present invention, a driving waveform in the other subfields excepting the first subfield will be described in more detail with reference to FIG. 8.

Figure 8:
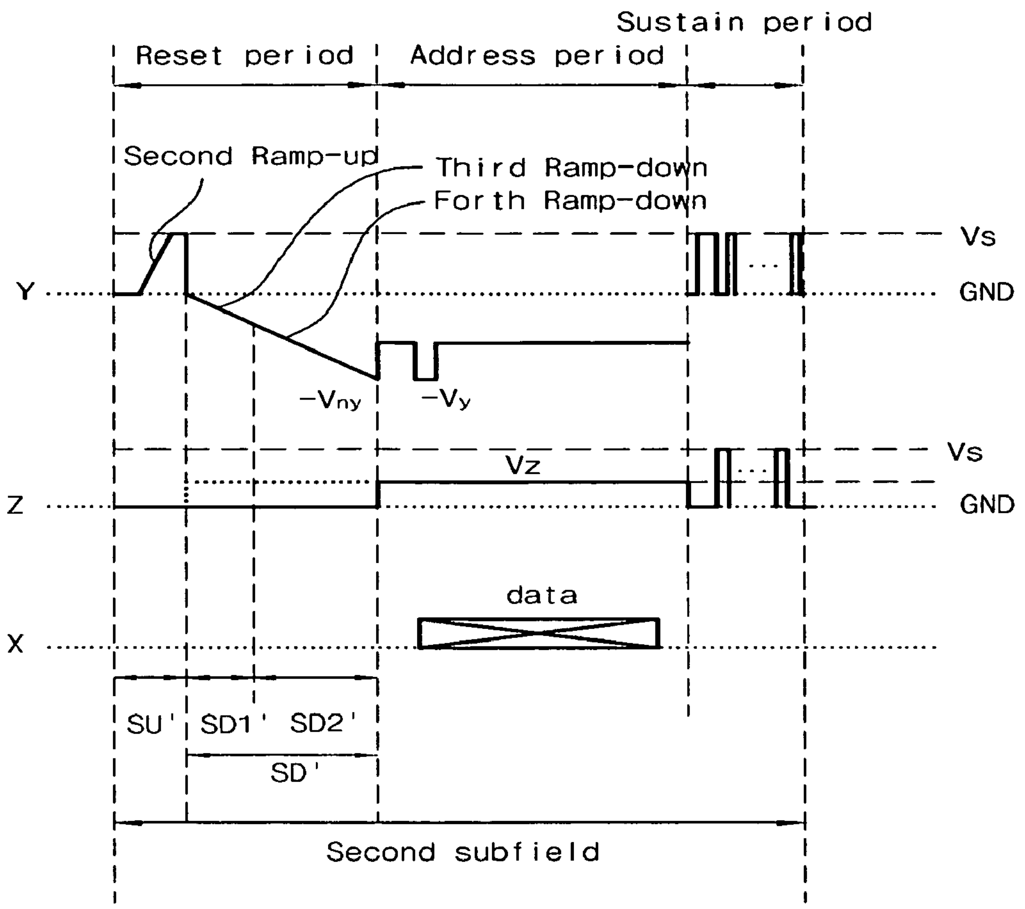
FIG. 8 is an enlarged view showing a driving waveform in the subfields excepting the first subfield of FIG. 7 in detail.
Figure 9A:
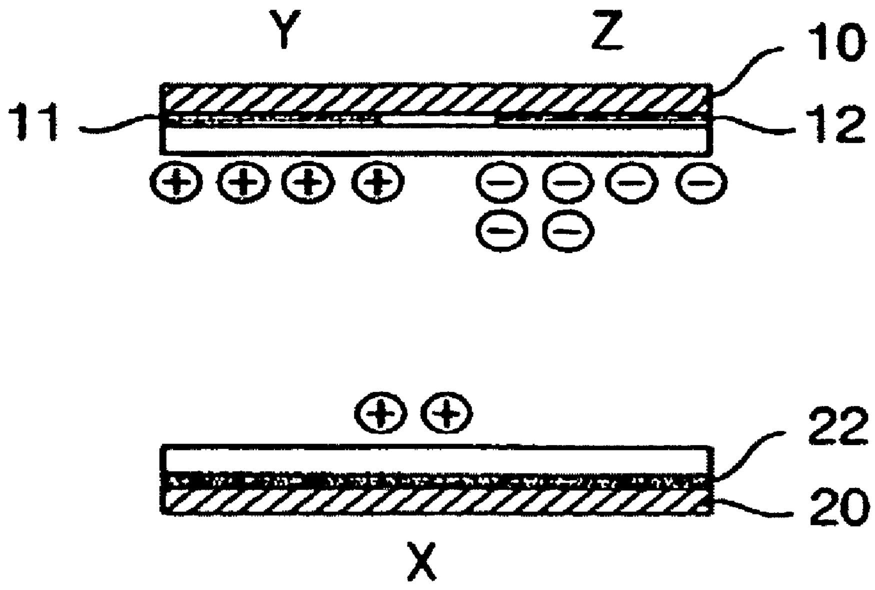
FIGS. 9*a* to 9*d* are views conceptually showing the distribution of wall charges in a discharge cell of each period according to the driving waveform of FIG. 8.

FIG. 8 is an enlarged view showing a driving waveform in the subfields excepting the first subfield of FIG. 7 in detail. FIGS. 9*a*to 9*d* are views conceptually showing the distribution of wall charges in a discharge cell of each period according to the driving waveform of FIG. 8;

Referring to FIGS. 9*a*to 9*d* in conjunction with FIG. 8, in the set-up interval SU', if a second rising ramp waveform whose peak value is higher than a sustain voltage Vs is applied to the scan electrodes, and a voltage of the ground GND level is applied to the sustain electrodes, as shown in FIG. 9*a*, a surface discharge occurs and thus a sufficient number of wall charges are formed within discharge cells.

Figure 9B:
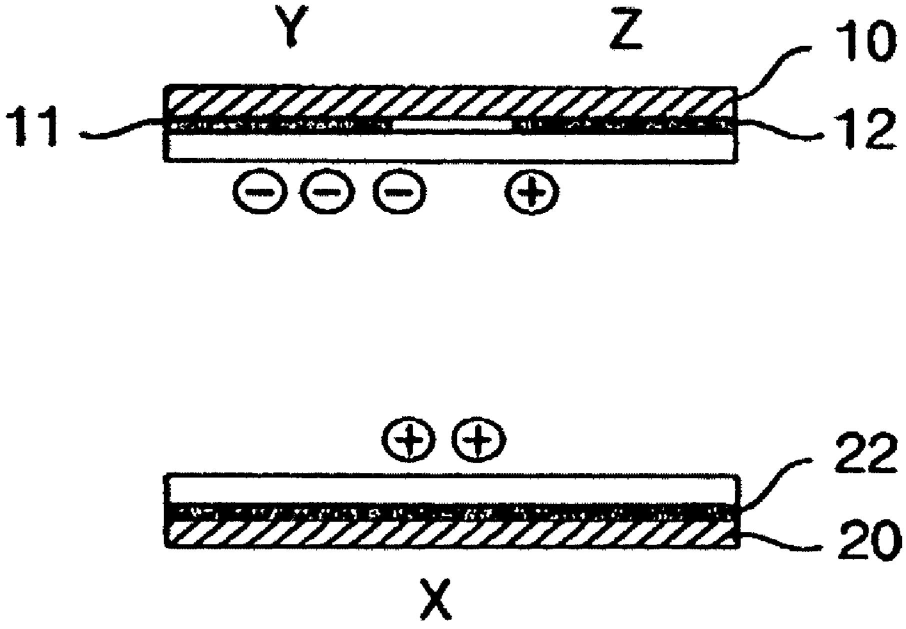

In the first set-down interval SD1', if a third falling ramp waveform falling from the ground GND level to a voltage level −Vmy less than the ground GND level is applied to the scan electrodes, and a voltage of the ground GND level or a predetermined positive voltage Vz is applied to the sustain electrodes, as shown in FIG. 9*b*, certain parts of wall charges within discharge cells are erased by a surface discharge occurred between the scan electrodes and the sustain electrodes.

Figure 9C:
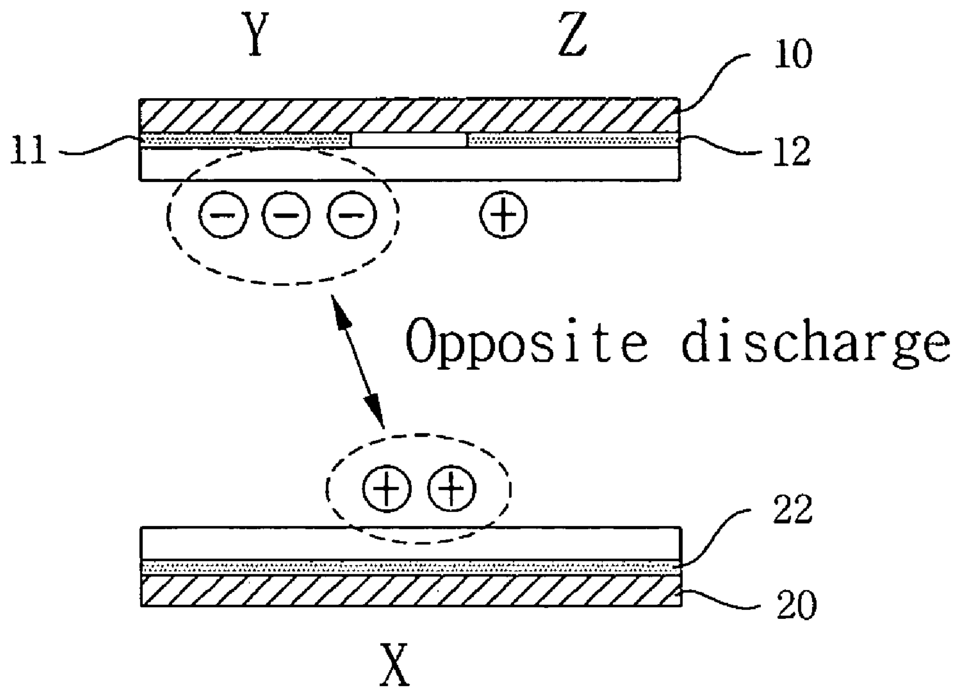
Figure 9D:
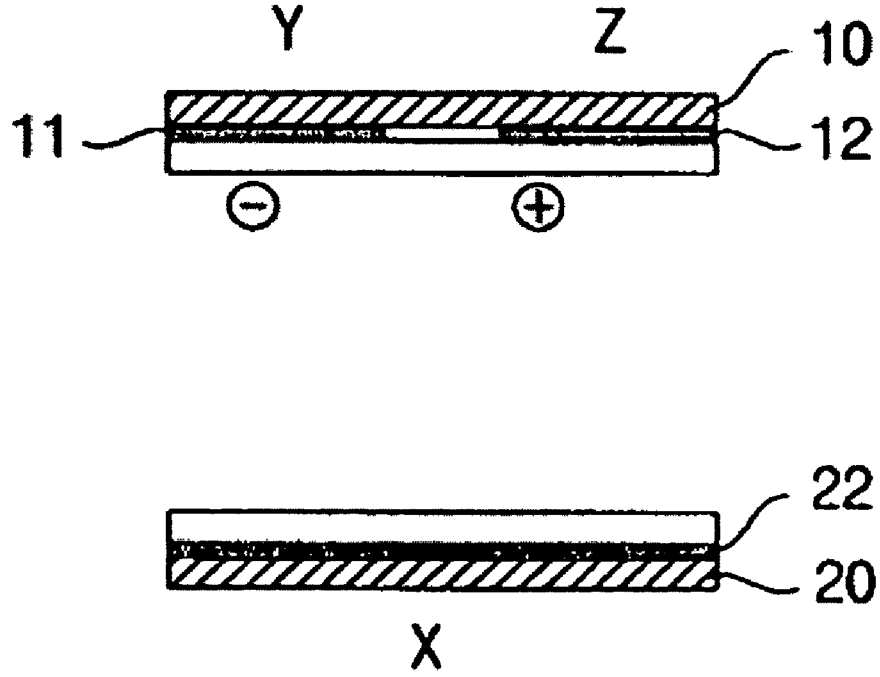

Meanwhile, as shown in FIG. 9*b*, if a fourth falling ramp waveform falling from the lowest value −Vmy of the third falling ramp waveform to a specific voltage −Vmy is applied to the sustain electrodes in a state where a voltage of the ground GND level or a positive voltage Vz is constantly applied, as shown in FIG. 9*c*, an opposite discharge occurs by wall charges accumulated in the address electrodes and scan electrodes.

Regarding the distribution of wall charges after the opposite discharge between the address electrodes and the scan electrodes, most of them are erased as shown in FIG.>9*d*, thereby making the wall charge within the cells uniform.

Figure 10:
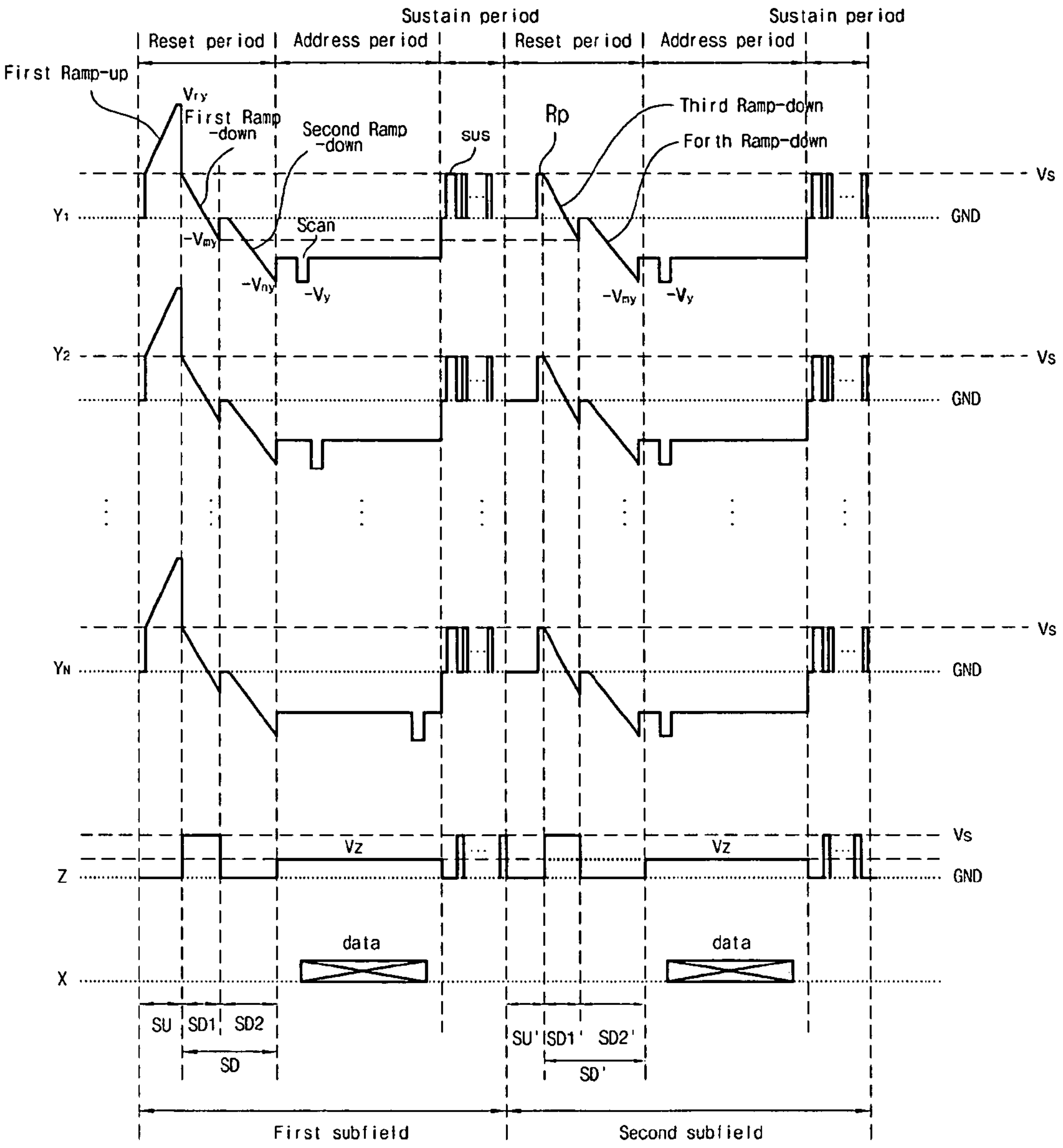
FIG. 10 is a view showing a third driving waveform according to the driving method of a plasma display apparatus according to the present invention.

FIG. 10 is a view showing a third driving waveform according to the driving method of a plasma display apparatus according to the present invention.

Like the first driving waveform of the present invention, as the second driving waveform of the plasma display apparatus of the present invention, different reset waveforms are supplied in the reset period of the first subfield and of the other subfields. The waveform supplied in the reset period of the first subfield is the same as the first driving waveform of the present invention, so a description thereof will be omitted.

<Other Subfields Excepting First Subfield>

Upon driving the plasma display apparatus of the present invention, in the driving waveform supplied in the reset period of the other subfields excepting the first subfield, as shown in the drawings, in the set-up SU interval, a positive waveform Rp of a sustain voltage is applied all of the scan electrodes Y1 to Yn and a ground level voltage is applied to the sustain electrodes. At this time, the cells that do not participate in a discharge in the sustain period of the first subfield are maintained without any discharge, while the cell that participate in a discharge in the sustain period of the subfield undergo a surface discharge between the scan electrodes and the sustain electrodes by the second rising ramp waveform, thereby erasing wall charges between the scan electrodes and the sustain electrode to some extent.

Like the first subfield, a set-down (SD') interval is divided into a first set-down interval SD1' and a second set-down SD2' interval. A third falling ramp waveform is supplied to all of the scan electrodes Y1 to Yn in the first set-down interval, and a fourth falling ramp waveform is supplied to all of the scan electrodes Y1 to Yn in the second set-down interval. A round waveform of a predetermined voltage is supplied to the sustain electrodes while the third falling ramp waveform is being supplied to the scan electrodes. The third falling ramp waveform and fourth falling ramp waveform are the same as the first falling ramp waveform and second falling ramp waveform applied in the set-down interval of the first subfield, so a description thereof will be omitted.

Figure 11:
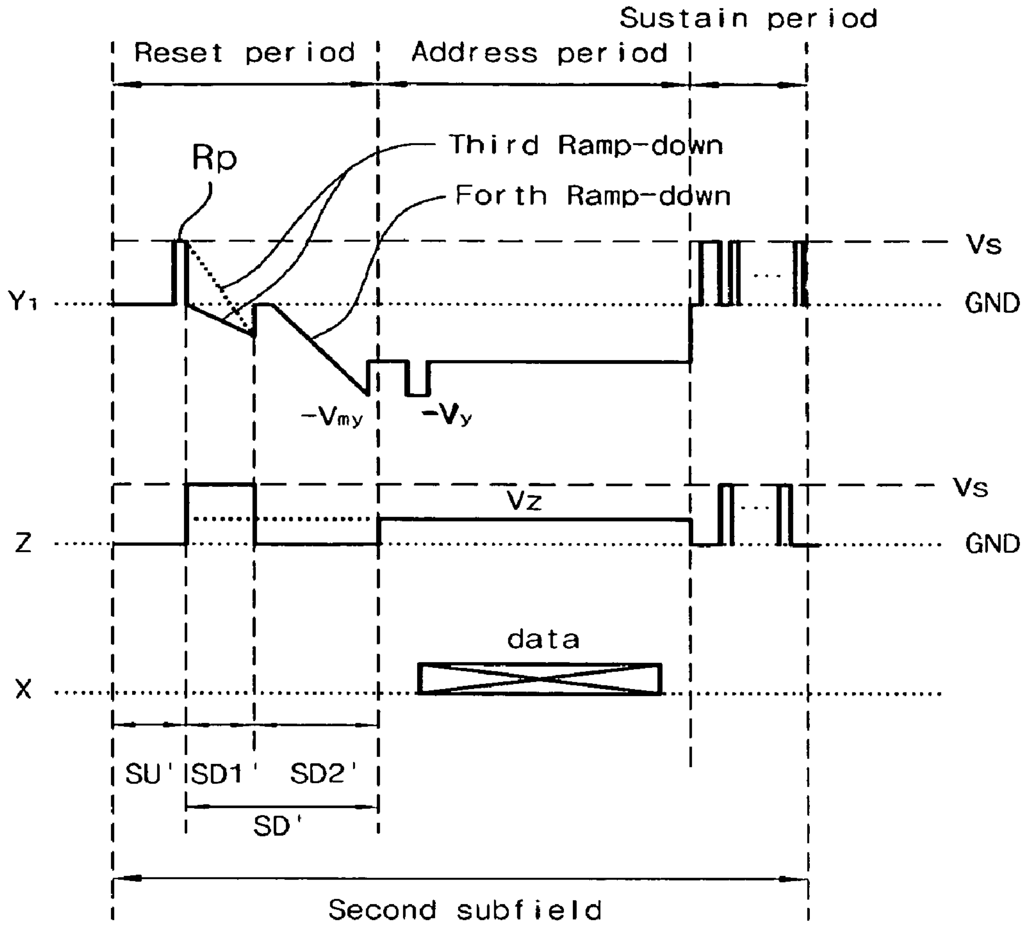
FIG. 11 is a view showing another driving waveform supplied in the reset period of the subfields excepting the first subfield of FIG. 10.

FIG. 11 is a view showing another driving waveform supplied in the reset period of the subfields excepting the first subfield of FIG. 10.

Figure 12A:
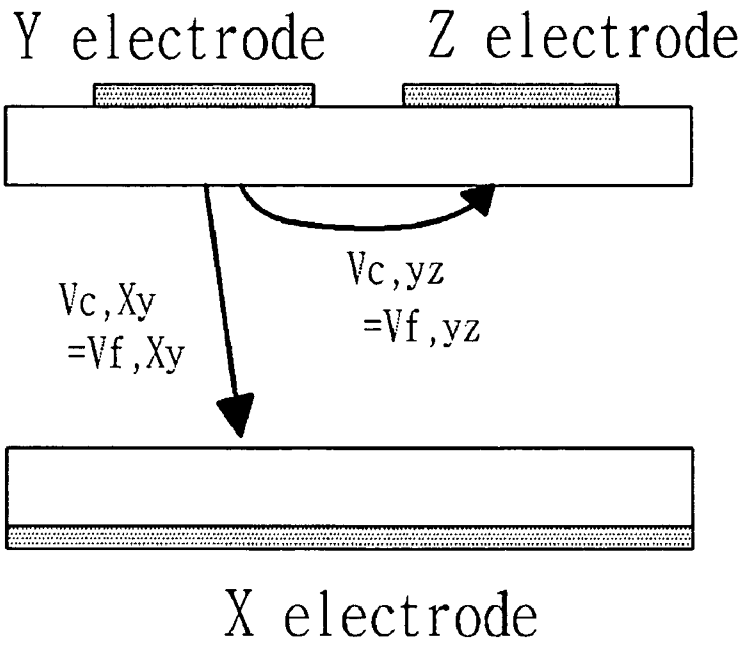
FIGS. 12*a* and 12*b* are views showing a cell voltage after the reset period according to a conventional driving waveform and a cell voltage after the reset period according to a driving waveform of the present invention.
Figure 12B:
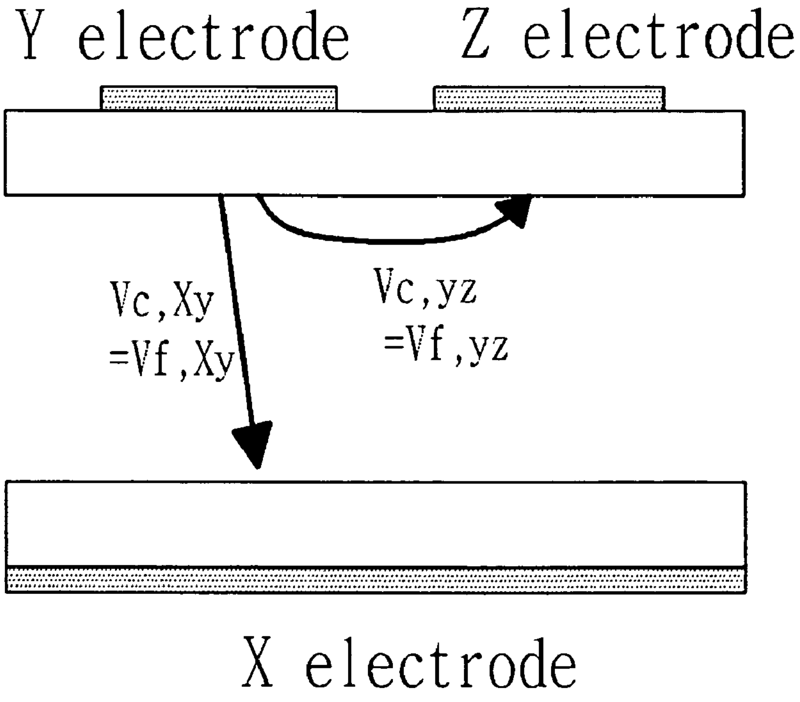

Referring to FIG. 11, when a positive waveform applied in the reset period falls from a sustain voltage Vs directly to a predetermined voltage −Vmy less than the ground level, the ramp may fall from the sustain voltage Vs directly to the predetermined voltage −Vmy less than the ground level or the ramp may fall to a predetermined voltage −Vmy after falling from a sustain voltage Vs to the ground level. FIGS. 12*a* and 12*b* are views showing a cell voltage after the reset period according to a conventional driving waveform and a cell voltage after the reset period according to a driving waveform of the present invention.

As shown in FIG. 12*a*, in the conventional driving waveform, the cell voltage Vc,yz between the scan electrodes and the sustain electrodes and the cell voltage Vc,xy between the address electrodes and the scan electrodes are maintained so as to be firing voltages Vf,yz and Vf,xy.

On the other hand, as shown in FIG. 12*b*, in the driving waveform of the present invention, the cell voltage Vc,xy between the address electrodes and the scan electrodes is maintained as a firing voltage Vf,xy, while the cell voltage Vc,yz between the scan electrodes and the sustain electrodes are smaller than a firing voltage Vf,yz.

The reason why the cell voltage Vc,yz between the scan electrodes and the sustain electrodes is smaller than the firing voltage Vf,yz is because when the second falling ramp waveform and the fourth falling ramp waveform are supplied to the scan electrodes, a voltage Vz lower than a sustain voltage but higher than the ground level is supplied to the sustain electrodes The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A plasma display apparatus, comprising:

a plasma display panel having a scan electrode and a sustain electrode;

a scan driver for sequentially supplying a first rising ramp waveform, a first falling ramp waveform and a second falling ramp waveform to the scan electrode during a reset period of a first subfield of a plurality of subfields; and a sustain driver for supplying a round waveform to the sustain electrode while the first rising ramp waveform is being supplied to the scan electrode, wherein the reset period of the first subfield is divided into a set-up stage during which the first rising ramp waveform is supplied to the scan electrode, a first set-down stage during which the first falling ramp waveform is supplied to the scan electrode, and a second set-down stage during which the second falling ramp waveform is supplied to the scan electrode, wherein the second falling ramp waveform is supplied after being rapidly risen to a ground level at the point of time when the first falling ramp waveform is finished.

2. The apparatus of claim 1, wherein the lowest voltage of the first falling ramp waveform and second falling ramp waveform is a negative voltage.

3. The apparatus of claim 2, wherein the lowest voltage of the second falling ramp waveform is lower than the lowest voltage of the first falling ramp waveform.

4. The apparatus of claim 1, wherein the highest voltage of the round waveform is a voltage of sustain pulse applied in the sustain period.

5. The apparatus of claim 1, wherein the scan driver supplies to the scan electrode a third falling ramp waveform falling after maintaining a predetermined voltage during the reset period of the subfields excepting the first subfield of the plurality of subfields and consecutively a fourth falling ramp waveform subsequent to the third falling ramp waveform, and the sustain driver supplies a second rising ramp waveform to the sustain electrode while the scan electrode is maintaining a predetermined voltage.

6. The apparatus of claim 5, wherein the predetermined voltage is a voltage of the ground level.

7. The apparatus of claim 5, wherein the highest voltage of the second rising ramp waveform is a sustain voltage.

8. The apparatus of claim 5, wherein the lowest voltage of the fourth falling ramp is the same as the lowest voltage of the second falling ramp waveform.

9. The apparatus of claim 1, wherein the scan driver sequentially supplies to the scan electrode a second rising ramp waveform, third falling ramp waveform and fourth falling ramp waveform smaller in size than the first rising ramp waveform during the reset period of the subfields excepting the first subfield of the plurality of subfields, and the sustain driver maintains the sustain period at a predetermined voltage during the reset period of the subfields excepting the first subfield of the plurality of subfields.

10. The apparatus of claim 9, wherein the predetermined voltage is a voltage of the ground level.

11. The apparatus of claim 9, wherein the highest voltage of the second rising ramp waveform is a sustain voltage.

12. The apparatus of claim 1, wherein the scan driver sequentially supplies to the scan electrode a third falling ramp waveform and a fourth falling ramp waveform during the reset period of the subfields excepting the first subfield of the plurality of subfields, and the sustain driver supplies a round waveform while the third falling ramp waveform is being supplied to the scan electrode.

13. The apparatus of claim 12, wherein the lowest voltage of the third falling ramp waveform is the same as the lowest voltage of the first falling ramp waveform, and the lowest voltage of the fourth falling ramp waveform is the same as the lowest voltage of the second falling ramp waveform.

14. The apparatus of claim 12, wherein the highest voltage of the round waveform is a voltage of sustain pulse applied in the sustain period.

15. A driving method of a plasma display apparatus, which divides a plurality of subfields with a different number of times of light emission into a reset period, an address period and a sustain period, and displays an image by applying a signal to a scan electrode, sustain electrode and address electrode in the respective periods, a surface discharge occurs two times between the scan electrode and the sustain electrode in the reset period of the first subfield of the plurality of subfields, and an opposite discharge occurs between the scan electrode and the address electrode, wherein the reset period of the first subfield is divided into a set-up stage during which a first surface discharge is occurred by supplying a first rising ramp waveform to the scan electrode, a first set-down stage during which a second surface discharge is occurred by supplying a first falling ramp waveform to the scan electrode, and a second set-down stage during which the opposite discharge is occurred by supplying a second falling ramp waveform to the scan electrode, wherein the second falling ramp waveform is supplied after being rapidly risen to a ground level at the point of time when the first falling ramp waveform is finished.

16. The method of claim 15, wherein the first rising ramp waveform is applied to the scan electrode and a voltage of the ground GND level is applied to the sustain electrode during the set-up stage, the first falling ramp waveform falling from a predetermined voltage is applied to the scan electrode and a sustain voltage Vs is applied to the sustain electrode during the first set-down stage, and the second falling ramp waveform maintaining a ground level voltage and then falling after a predetermined point of time is applied to the scan electrode and a voltage less than the sustain voltage Vs is applied to the sustain electrode during the second set-down stage.

17. The method of claim 15, wherein the reset period of the subfields excepting the first subfield includes:

a set-up stage during which a ground (GND) level voltage is applied to the scan electrode and a second rising ramp waveform smaller in size than a first rising ramp in the reset period of the first subfield;

a first set-down stage during which a third falling ramp waveform falling from the ground level GND voltage is applied to the scan electrode and a voltage of the ground level GND is applied to the sustain electrode; and a second set-down stage during which a fourth falling ramp waveform falling from the lowest value of the third falling ramp waveform is applied to the scan electrode and a voltage of the ground level (GND) is applied to the sustain electrode.

18. The method of claim 15, wherein the reset period of the subfields excepting the first subfield includes:

a set-up stage during which a rising ramp waveform smaller in size than a rising ramp in the reset period of the first subfield is applied to the scan electrode and a ground level (GND) voltage is applied to the sustain electrode;

a first set-down stage during which a third falling ramp waveform falling from a predetermined voltage is applied to the scan electrode and a voltage less than a sustain voltage Vs is applied to the sustain electrode; and a second set-down stage during which a fourth falling ramp waveform falling from the lowest value of the third falling ramp waveform is applied to the scan electrode and a voltage of the sustain voltage Vs is applied to the sustain electrode.

19. The method of claim 15, wherein the reset period of the subfields excepting the first subfield includes:

a set-up stage during which a predetermined voltage is applied to the scan electrode and a voltage of the ground GND level is applied to the sustain electrode;

a first set-down stage during which a third falling ramp waveform falling from a predetermined voltage is applied to the scan electrode and a sustain voltage Vs is applied to the sustain electrode; and a second set-down stage during which a fourth falling ramp waveform maintaining a ground level voltage and then falling after a predetermined point of time is applied to the scan electrode and a voltage less than the sustain voltage Vs is applied to the sustain electrode.

20. A plasma display apparatus, comprising:

a plasma display panel having a scan electrode and a sustain electrode;

a scan driver for sequentially supplying a first rising ramp waveform to the scan electrode and then at least two falling ramp waveforms during the reset period of the first subfield of a plurality of subfields; and a sustain driver for supplying a round waveform to the sustain electrode while one of the at least two falling ramp waveforms is being supplied to the scan electrode, wherein the reset period of the first subfield is divided into a set-up stage during which the first rising ramp waveform is supplied to the scan electrode; and at least two set-down stages during which the at least two falling ramp waveforms are supplied to the scan electrode, wherein the latter falling ramp waveform is supplied after being rapidly risen to a ground level at the point of time when the former falling ramp waveform is finished.

* * * * *